United States Patent
Swierczewski

(12) 
(10) Patent No.: US 6,851,747 B2
(45) Date of Patent: Feb. 8, 2005

(54) COLLAPSIBLE VEHICLE SAFETY SEAT

(76) Inventor: Richard Swierczewski, 59 Oak Glen Rd., Toms River, NJ (US) 08753

( * ) Notice: Subject to any disclaimer, the term of this patent is extended or adjusted under 35 U.S.C. 154(b) by 0 days.

(21) Appl. No.: 10/773,052

(22) Filed: Feb. 6, 2004

(65) Prior Publication Data

US 2004/0160095 A1 Aug. 19, 2004

Related U.S. Application Data

(63) Continuation-in-part of application No. 10/390,723, filed on Mar. 19, 2003, now Pat. No. 6,742,838, which is a continuation-in-part of application No. 09/557,973, filed on Apr. 25, 2000, now Pat. No. 6,257,663.

(51) Int. Cl.[7] .................................................. B60N 2/42
(52) U.S. Cl. .................................................. 297/216.19
(58) Field of Search ........................ 297/216.1, 216.15, 297/216.16, 216.19, 216.2

(56) References Cited

U.S. PATENT DOCUMENTS

| | | | | | |
|---|---|---|---|---|---|
| 3,953,068 | A | * | 4/1976 | Porsche et al. ........ | 297/216.15 |
| 4,257,626 | A | * | 3/1981 | Adomeit ..................... | 280/806 |
| 5,344,204 | A | * | 9/1994 | Liu ............................ | 296/68.1 |
| 5,556,160 | A | * | 9/1996 | Mikami ................... | 297/216.1 |
| 6,565,151 | B2 | * | 5/2003 | Jarnail et al. .......... | 297/216.16 |

* cited by examiner

Primary Examiner—Milton Nelson, Jr.
(74) Attorney, Agent, or Firm—Clifford G. Frayne

(57) ABSTRACT

A collapsible vehicle safety seat is essentially designed to restrain movement of the occupant especially at the time of frontal, rear-end and lateral collisions in high and low speed or when an impact becomes inevitable. The seat includes an actuator controlled and operated electronically or manually. The onset of the collision sequences the car crash sensor or collision avoidance devices including occupant voice activated actuator. The trigger release forces of a biasing member or equivalently devices electromagnetic or pyrotechnic to deploys instantly pivot frame incorporated with movable seat cushion, seat back and headrest. The alteration of the movable seat assembly from a normal stationary position creates a safety zone that allows occupants to lower their center of gravity to an optimum seating position.

6 Claims, 7 Drawing Sheets

COLLAPSIBLE VEHICLE SAFETY SEAT

RELATED APPLICATIONS

This application is a continuation-in-part application of application Ser. No. 10/390,723, filed Mar. 19, 2003, U.S. Pat. No. 6,742,838 which was a continuation-in-part of application Ser. No. 09/557,973, filed Apr. 25, 2000, now U.S. Pat. No. 6,257,663 B1.

BACKGROUND OF THE INVENTION

1. Field of the Invention

The present invention relates generally to the vehicle seats, and more particularly to an electronically operated collapsible seat cushion, seat back and headrest for restraining kinematics to an occupant's body when the vehicle is involved in frontal, rear-end or lateral collision.

2. Description of the Prior Art

There are many patents in the prior art, which are drawn to a vehicle seat for absorbing different types of forces, shocks, and vibrations commonly encountered in vehicular collisions.

For example, U.S. Pat. No. Re. 35,572 issued on Jul. 29, 1997 to Lloyd et al. discloses a seat assembly for a motor vehicle that includes an air suspension system for isolating the occupant of the seat from shock, vibration and inertial forces directed along both vertical and horizontal axes. A base plate is mounted to the floor of the vehicle and supports first and second pairs of sleeve bearings on opposed sides of a box-like housing. The housing is attached to a pair of guide rods, which cooperate with the sleeve bearings to provide fore and aft movement of the housing. Springs operating in cooperation with a first horizontally disposed air bag serves to dampen out inertial forces to the vehicle seat. The seat itself is supported atop a vertically oriented air spring and a plurality of hydraulic vibration dampeners that tend to cushion vertically directed forces acting upon the seat and its occupant.

U.S. Pat. No. 2,227,717 issued on Jan. 7, 1941 to Jones relates to structure for mounting a chair to the body of an airplane. The structure is designed to move the chair forwardly and upwardly in the event of collision, whereby the person occupying the chair will be tossed in a curved path and thus relieved substantially from shock caused by the collision forces.

U.S. Pat. No. 3,081,059 issued on Mar. 12, 1963 to Hastings et al. is drawn to a seat base having an inverted cone secured to the underside of the seat. The front legs of the seat are pivotally mounted to the floor of the vehicle. A single rear leg telescopes against the action of a spring.

U.S. Pat. No. 4,275,914 issued on Jun. 30, 1981 to Holweg et al., discloses an arresting device in a longitudinally adjustable guide rail assembly for motor vehicle seats. The device includes a shaft rotatably supported in a stationary bearing plate and driven by a stationary electromotor. The driving pinion of the electromotor is in mesh with an intermediate gear, which is supported for joint rotation on the shaft. A coupling disk is supported for joint rotation on the shaft and for axial displacement between the bearing plate and the face of an intermediate gear.

U.S. Pat. No. 5,292,179, issued on Mar. 8, 1994 to Forget, discloses a fixed plate supporting a vehicle seat that is secured to longitudinal adjusting slides. The fixed plate supports a rotary intermediate plate via a first ball bearing and cover rigidly connected to the fixed plate and supported at the rotary intermediate plate via a second ball bearings.

U.S. Pat. No. 5,344,204, issued on Sep. 6, 1994 to Liu, discloses a safe driver seat unit that includes a seat supported on two rails by four ball bearings mounted in the seat legs, and arrangement wherein an electromagnetic controller locks the seat in normal position. In a collision, sensors will turn on power to unlock the seat so that springs may move the seat backwardly.

U.S. Pat. No. 5,605,372, issued on Feb. 25, 1997 to Al-Abdullateef, discloses an automotive safety seat that reduces g-loads imparted to an occupant during a collision by absorbing some of the energy of impact. Kinetic energy is converted to potential energy with the elevation of the seat and its occupant and the compression of springs.

U.S. Pat. No. 5,743,591, issued on Apr. 28, 1998 to Tame, discloses a vehicle seat, which includes a seat cushion assembly and a hydraulic actuator. A first mounting assembly is constructed and arranged to mount the seat cushion assembly on a vehicle floor, and a second mounting assembly is provided which is contructed and arranged to mount a seat back cushion assembly on the seat cushion assembly.

German Patent No. 2,112,443, published Sep. 23, 1971, discloses a vehicle passenger safety system which has the seat belt anchorages and/or the seating rear anchorage points attached through energy absorbing components so that each passenger describes a predetermined path within the compartment with an increasing braking force until suitable padding brings the passenger to safe stop.

German Patent No. 2,060,951, published Jun. 22, 1972, discloses a car seat that is mounted on a spring-loaded support to absorb impact forces. The support is braced by either mechanical springs or hydraulic shock absorbers, and converts impact forces into a smooth recoil to protect the occupants in the event of a collision.

Great Britain Patent No. 2,087,226A, published May 26, 1982, discloses a shock absorbing seat that is formed by two connected portions. The shorter rear portion is a flat metal sheet bent upwardly at the back and riveted to the rear cross-member of a tubular support frame. The front portion includes a metal sheet which is "waisted" in plain view and curved upwardly from the rear in side elevation to a smoothly curved peak from which it is bent downwardly as a flat vertical panel. The panel is riveted along its lower edge to the front cross-member of the support frame.

None of the above inventions and patents, taken either singly or in combination, is seen to disclose a collapsible seat, which creates a zone restraining occupant movement independently of the vehicle in the event of an accident, as will subsequently be described and claimed in the instant application.

SUMMARY OF THE INVENTION

A collapsible vehicle seat is essentially designed to restrain movement of the occupant especially at the time of frontal, rear-end and lateral collisions in high and low speed or when an impact becomes inevitable. The seat includes an actuator controlled and operated electronically or manually. The onset of the collision sequences the car crash sensor or collision avoidance devices including occupant voice activated actuator. The trigger release forces a biasing means or equivalent device electromagnetic or pyrotechnic to deploy instantly pivoting a frame incorporated with movable seat cushion, seat back and headrest. The alteration of a movable seat assembly from a normal stationary position creates a safety zone that allows occupants to lower their center of gravity before ejection, whiplash or ramming occurs. The dynamic seat restraint of the occupant and improves safety performance of the seat belt integrated with movable seat cushion and seat back. An isolation mount pan dissipates crash energy and minimizes interaction between vehicle and seat. The seat bottom support structure is encapsulated into an isolation mount pan. The plurality mount pans contains a resilient material to hold the seat support structure in proper position and delay response of the seat to the impacted vehicle. The isolation performance of the mount pan improves the vehicle absorbing energy devices including a crumple zone. The isolation mount pan is affixed to the seat adjustment mechanism in conventional manner.

OBJECTS OF THE INVENTION

It is the principal object of the invention to provide a collapsible vehicle seat including a movable seat cushion, seat back cushion and headrest to engage and restrain occupant kinematics during collisions of the vehicle especially frontal impact.

It is another object of the invention to provide a collapsible vehicle seat including controlled electronically actuator to collapse a seat cushion, a seat back cushion and a headrest from its stationary position to a deployed position and create a zone for anticipated reaction of occupants when a collision occurs or becomes inevitable.

It is another object of the invention to provide a collapsible vehicle seat including a plurality isolation mount pans and encapsulated seat support structure to separate the seat assembly from the structural integrity of the vehicle and minimize interaction between seat support structure and the vehicle.

It is another object of the invention to provide a collapsible vehicle seat including an isolation mount pan which contains a resilient material to dissipate the crash energy and delay reaction to the impact until seat assembly is transformed from stationary to deployed position.

It is an object of the invention to provide improved elements and arrangements thereof in an apparatus for the purposes described which are dependable, flexible in movement, and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE INVENTION

Figure 1:
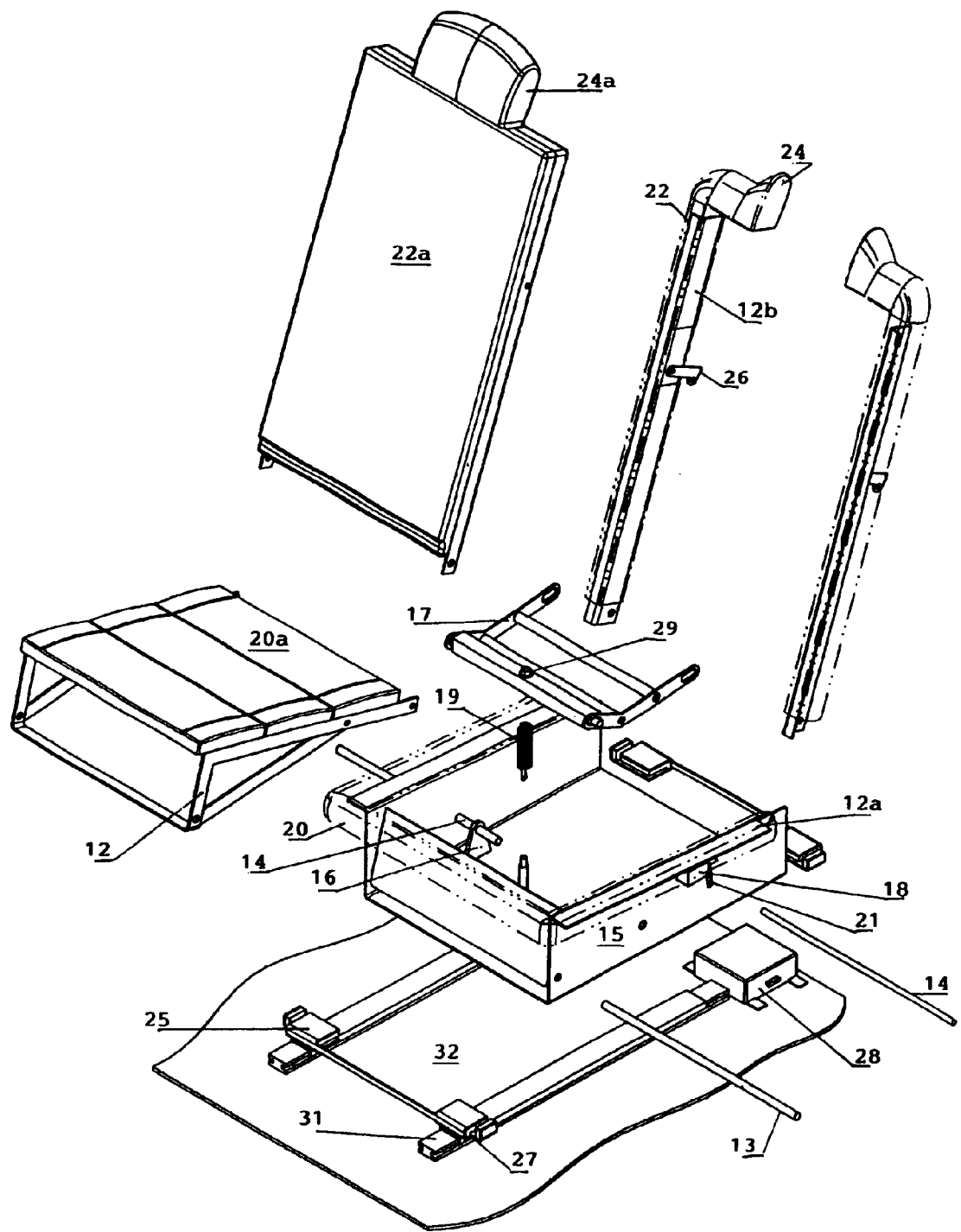
FIG. 1 is an exploded perspective view of a seat assembly according to the present invention.
Figure 2:
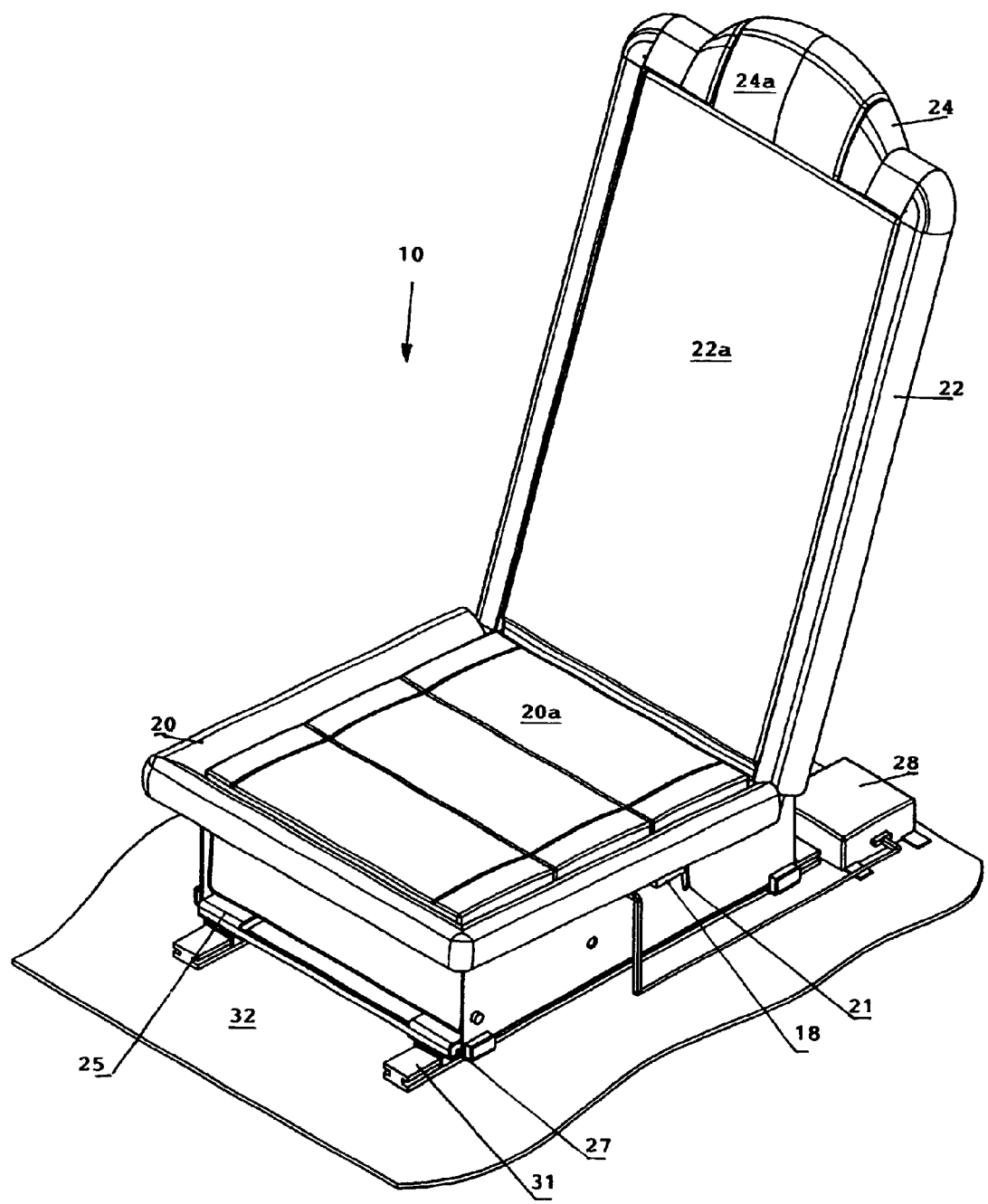
FIG. 2 is an isometric view of a vehicle seat in its normal position according to the present invention.
Figure 3:
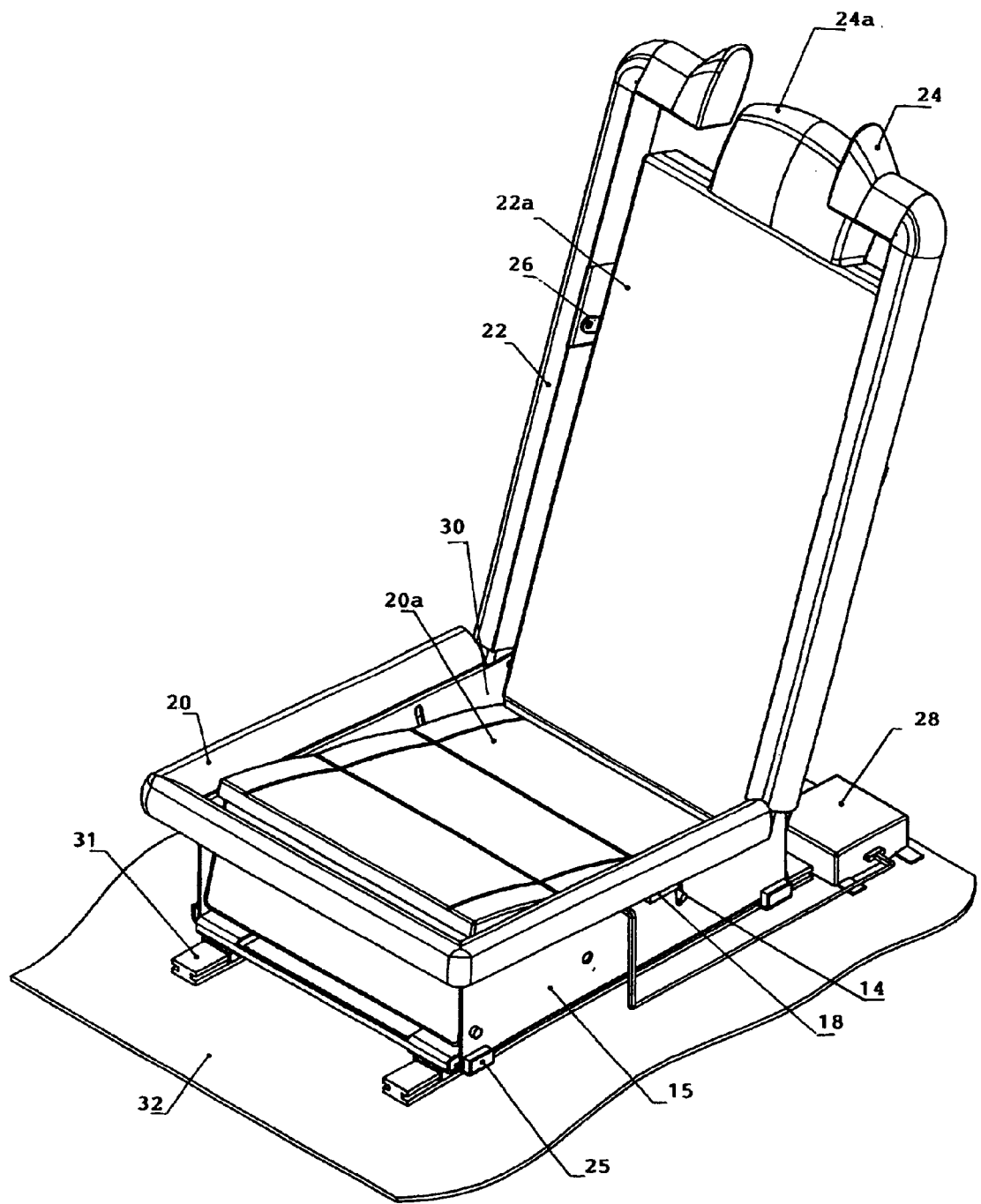
FIG. 3 is an isometric view of a vehicle seat in its deployed locked position according to the present invention.
Figure 4:
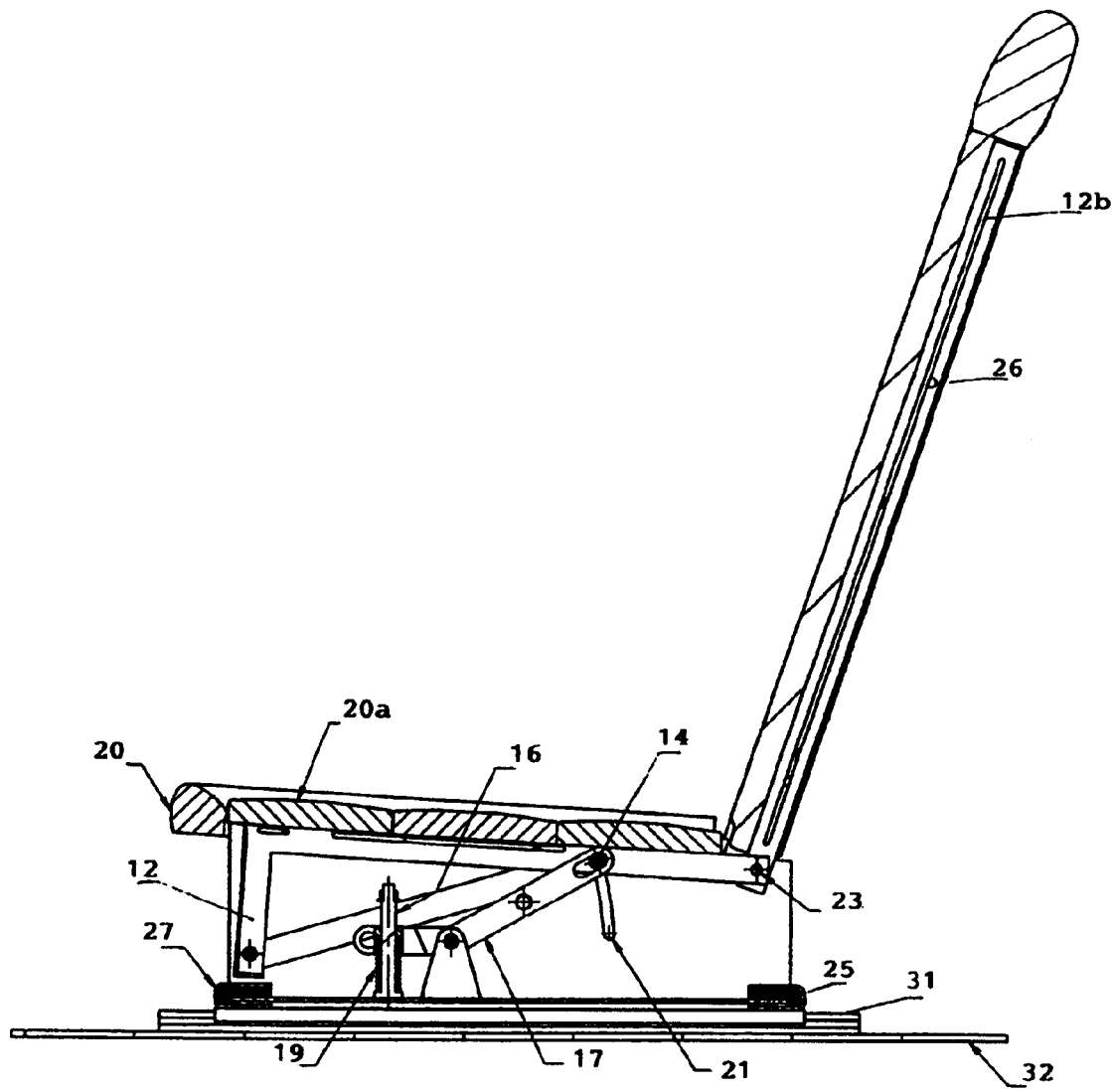
FIG. 4 is a side, sectional view of a vehicle seat in its normal position according to the present invention.
Figure 5:
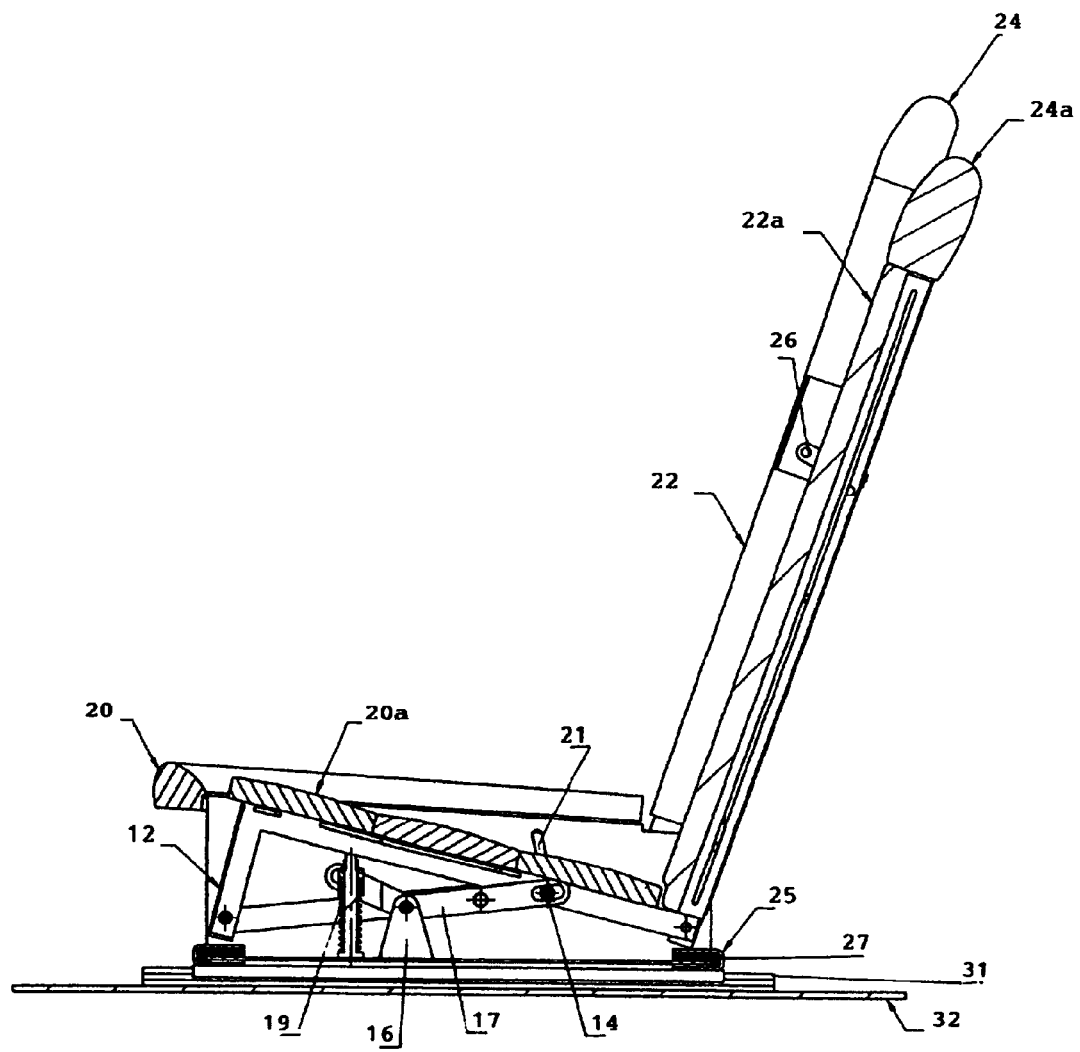
FIG. 5 is a side, sectional view of a vehicle seat in deployed locked position according to the present invention.
Figure 6:
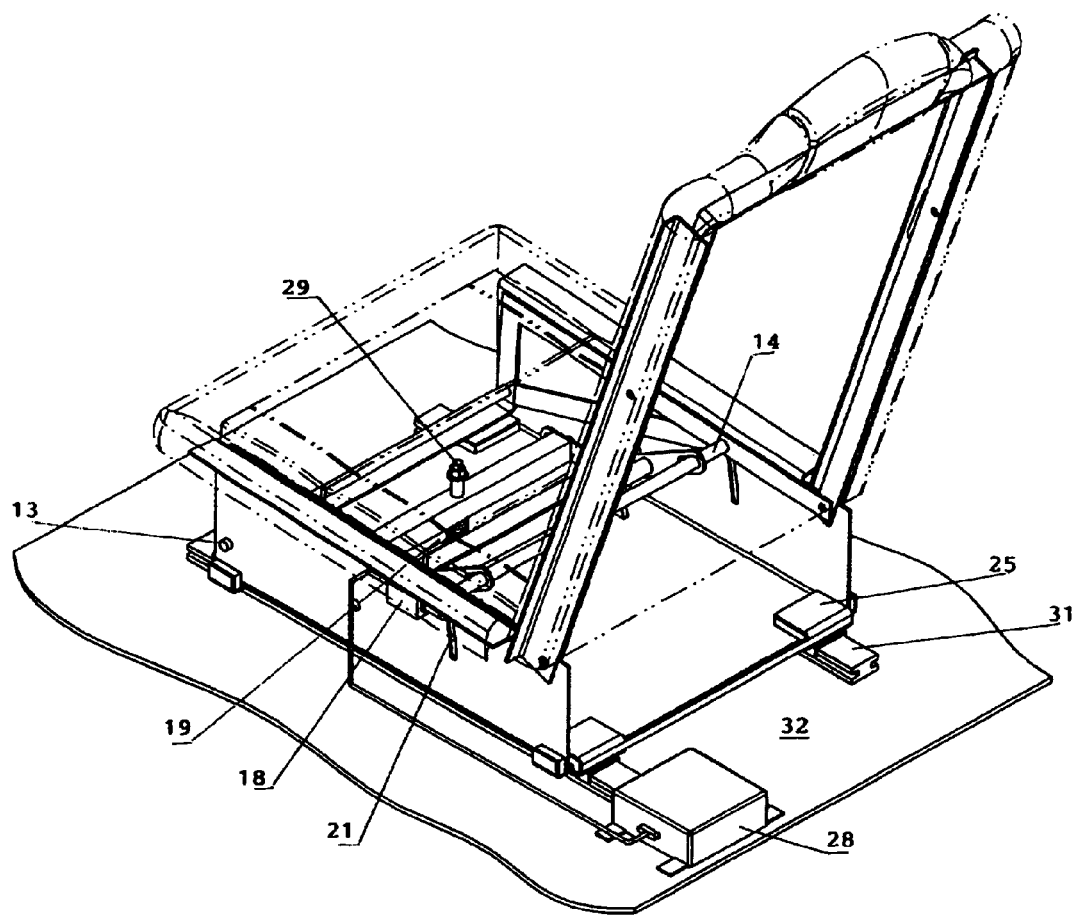
FIG. 6 is an isometric view of a vehicle seat internal frame in normal position according to the present invention.
Figure 7:
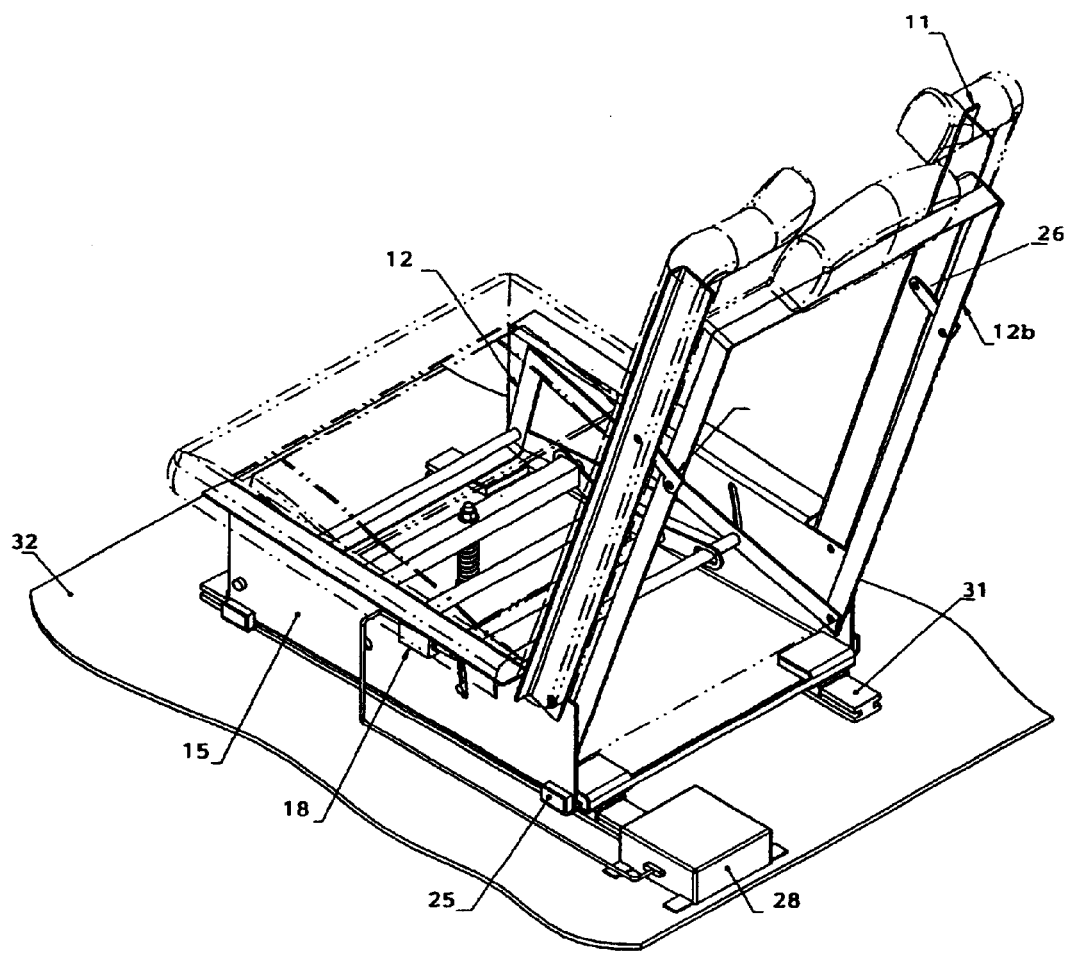
FIG. 7 is an isometric view of a vehicle seat internal frame in deployed locked position according to the present invention.

FIG. 1 is an exploded view of the safety seat 10 of the present invention, however, attention is first directed to FIGS. 2 and 3 wherein the seat of the present invention is generally indicated as 10. As best seen in FIG. 3 which illustrates the safety seat in a deployed locked position, movable seat cushion 20a, a seat back cushion 22a and a headrest 24a creates a safety zone 30 upon collision. The occupant is repositioned to a lower center of gravity so as to occupy a safety zone 30 before ejection or whiplash or severe interior vehicle contact. As best seen in FIGS. 4 and 5 a seat support structure 15 adopts actuator guide 16 and stationary internal frame 11. A stationary seat cushion 20, seat back cushion 22 and headrest 24 are integrated with stationary internal frame 11 and adopt conventional seat recliner 23. Alternatively seat 10 has a movable internal frame 12. Movable internal frame 12 comprises lower pivot link 13 and movable bolt 14 and upper movable link 26. A movable seat cushion 20a, movable seat back 22a and movable headrest 24a are integrated with movable frame 12. Movable seat cushion frame 12a is engaging with movable seat cushion 20a. Movable seat back frame 12b is engaged with movable seat back cushion 22a and movable headrest 24a. A movable internal frame 12 is functionally connected with support structure 15 by pivot link 13 and movable bolt 14. An actuator guide 16 is activated electronically or manually. An actuator guide 16 is activated electronically or manually or by car crash sensor or collision avoidance device (not shown) or by occupant's voice monitoring electronic control unit 28 when the vehicle is involved in collision. A trigger 18 releases a force generated by spring 19 or equivalent devices such as electromagnetic or pyrotechnic (not shown) and activates actuator 16. The force of compression spring 19 or equivalent devices electromagnetically or pyrotechnically (not shown) pulls down actuator pivot frame 17. Actuator spring 19 is fixedly secured on bracket 29. Actuator pivot frame 17 is engaged with a seat cushion movable frame 12a and seat back movable frame 12b. Movement pivot frame 17 instantly deploys movable seat cushion 20a, movable seat back cushion 22a and movable headrest 24a. Actuator pivot frame 17 comprises a slot guide 21 interposing on the both sides of the support structure 15. The displacement of seat cushion 20a, seat back cushion 22a and headrest 24a from normal to deployed position is limited by movable bolt 14 traveling in guide slot 21. As best seen on the FIGS. 6 and 7 a support structure 15 includes trigger 18. Trigger 18 is wired to electronic control unit 28. As best seen in FIGS. 4 and 5 an isolation pan 25 contains resilient material 27 to dissipate and delay response-seat assembly 10 and occupants from the impact. Isolation pan 25 is attached to adjusting mechanism 31. An adjusting mechanism is affixed conventionally to vehicle floor pan 32. A resilient material 27 diminishes interaction between an impacted vehicle and the support structure 15. The omni-directional motion of the support structure 15 in accordance to the impact is gradually diminished in subsequent time intervals. The resilient material 27 provides performance exterior absorbing energy devices which includes a crumple zone. The bottom support structure 15 is encapsulated in isolating mount pan 25. A plurality of isolating mount pans 25 are affixed in a conventional manner to adjusting mechanism 31. After the collision forces have abated the trigger 18 is released manually or by power device (not shown). The pivot frame 17 and seat cushion 20a, seat back 22a and headrest 24a are returned to their normal position. The resilient material 27 and support structure 15 will return to its original position. Zone 30 permits the entire body of an occupant to be restrained during all types of collisions. Zone 30 allows occupants a high retention of his/her torso and pelvis and reduces the angle between occupants supported torso and unsupported head. Moreover, a stationary seat back cushion 22 and stationary headrest 24 improve protection to the occupant's torso and head especially during lateral collision. Otherwise, a stationary seat cushion 20 protects limbs by preventing transfer locomotion to the human body to lower extremities especially when frontal collision occur. Zone 30 restrains occupants dynamics and improves safety performance acting in conjunction with integrated seat belt. As contemplated, air bags incorporated with seatbelts will be positioned to deploy from the occupant to the vehicle instead of towards the occupant.

The present invention is, of course, in no way restricted to the specific disclosure of the specification and drawings, but also encompasses any modifications within the scope of the appended claims.

I claim:

1. A collapsible vehicle safety seat kinematically restraining occupant's body while maintaining propulsive characteristics and positioning occupants in an optimum seating position during car impact modes, the seat comprising, in combination:

a movable seat cushion interacting with an actuator pivot frame and a movable internal seat cushion frame;

a movable seat back and headrest interacting with a movable internal seat back frame and an upper movable link;

a stationary internal seat frame engaged with said movable, internal seat back frame and said movable internal seat cushion frame allowing vertical rotation;

an actuator pivot frame interconnecting said movable internal seat cushion frame;

an electronic activation means for vertical movement of said actuator pivot frame wherein said electronic activation means comprises an electronically operated actuator allowing said movable seat cushion, said seat back and said headrest instant vertical movement from a stationary to a deployed position creating a zone restraining said occupants kinematics during impact;

a support structure having opposing lateral first and second sides interconnecting said movable internal seat back frame and said movable internal seat cushion frame by a lower and upper pivot pin and a movable bolt;

a guide slot interposed on said sides of said support structure for movable bolt travel, an actuator spring fixedly secured on a bracket;

an encapsulated support structure bottom plate cooperative with a plurality of isolation pans containing a resilient material, said plurality of isolation pans attached to a seat adjusting mechanism.

2. The collapsible seat in accordance with claim 1, wherein said electronically operated actuator comprises a car crash sensor and collision avoidance feature automatically activating said actuator pivot frame and said movable internal seat cushion frame and said movable internal seat back frame to interact with said movable seat cushion, said seat back and said headrest creating said zone restraining occupants kinematics.

3. The collapsible seat in accordance with claim 2, wherein said electronically operated actuator further comprises an electronically controlled trigger providing force from a biasing means, electromagnetic or pyrotechnic, to create said zone between said stationary internal seat frame and said movable seat cushion, seat back and headrest.

4. The collapsible seat for restraining occupants kinematics in accordance with claim 3, wherein means to collapse said collapsible seat comprises an actuator pivot link and movable bolt traveling vertically into the guide slot interposing on both sides of said support structure.

5. The collapsible seat for restraining occupants kinematics in accordance with claim 1 wherein said plurality of isolation pans attached to said seat adjustment mechanism and support structure isolate said collapsible seat from an impacted vehicle to diminish said seat reaction to the impact.

6. The collapsible seat for restraining occupants kinematics in accordance with claim 5, wherein said plurality of isolation pans contain resilient material for absorption of crash energy and minimalization of interaction between said seat and said vehicle.

* * * * *